(12) United States Patent
Yu et al.

(10) Patent No.: US 9,592,918 B2
(45) Date of Patent: Mar. 14, 2017

(54) ACOUSTIC LINER

(71) Applicant: Rohr, Inc., Chula Vista, CA (US)

(72) Inventors: Jia Yu, San Diego, CA (US); Song Chiou, Cerritos, CA (US); Hwa-Wan Kwan, Chula Vista, CA (US); Jose S. Alonso-Miralles, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/312,156

(22) Filed: Jun. 23, 2014

(65) Prior Publication Data

US 2015/0367953 A1 Dec. 24, 2015

(51) Int. Cl.
| | |
|---|---|
| *B64D 33/02* | (2006.01) |
| *F02K 1/82* | (2006.01) |
| *G10K 11/172* | (2006.01) |
| *F02K 1/34* | (2006.01) |
| *F02C 7/045* | (2006.01) |
| *F02C 7/24* | (2006.01) |
| *G10K 11/175* | (2006.01) |
| *B64D 33/00* | (2006.01) |
| *F02K 1/78* | (2006.01) |
| *G10K 11/16* | (2006.01) |

(52) U.S. Cl.
CPC ............. *B64D 33/06* (2013.01); *B64D 33/02* (2013.01); *F02C 7/045* (2013.01); *F02C 7/24* (2013.01); *F02K 1/827* (2013.01); *G10K 11/175* (2013.01); *B64D 2033/0206* (2013.01); *F05D 2260/963* (2013.01); *G10K 11/172* (2013.01); *Y02T 50/672* (2013.01)

(58) Field of Classification Search
CPC .... B64D 2033/0206; B64D 2033/0213; B64D 29/00; B64D 33/02; B64D 33/06; G10K 11/168; G10K 11/172; F02C 7/045; F02K 1/827; F02K 1/82
USPC ................ 181/222, 214, 288, 292; 244/53 B
See application file for complete search history.

(56) References Cited

U.S. PATENT DOCUMENTS

| | | | | |
|---|---|---|---|---|
| 3,380,206 | A | * | 4/1968 | Barnett ............................ 52/145 |
| 3,542,152 | A | | 11/1970 | Adamson |
| 3,639,106 | A | | 2/1972 | Yate |
| 3,734,234 | A | * | 5/1973 | Wirt .............................. 181/286 |
| 3,821,999 | A | * | 7/1974 | Guess ............................ 181/296 |

(Continued)

FOREIGN PATENT DOCUMENTS

| | | |
|---|---|---|
| CN | 104723616 | 6/2015 |
| FR | 2201010 | 4/1974 |

(Continued)

OTHER PUBLICATIONS

EP search report for EP15173431.6 dated Nov. 9, 2015.

*Primary Examiner* — Edgardo San Martin
(74) *Attorney, Agent, or Firm* — O'Shea Getz P.C.

(57) ABSTRACT

An acoustic liner that may be for a turbofan engine includes a first panel that may be non-permeable and a permeable panel spaced from the first panel. A non-permeable wall located between the first panel and the permeable panel faces in a first direction away from the first panel and a non-permeable wall, also between the panels, faces in a second direction away from the first panel and traversing the first direction. The liner may further include a plurality of sidewalls spaced from one-another, extending between the panels, and through the walls.

5 Claims, 3 Drawing Sheets

(56) References Cited

U.S. PATENT DOCUMENTS

| | | | |
|---|---|---|---|
| 3,850,261 A * | 11/1974 | Hehmann | 181/286 |
| 3,910,374 A * | 10/1975 | Holehouse | 181/292 |
| 3,948,346 A | 4/1976 | Schindler | |
| 4,189,027 A * | 2/1980 | Dean et al. | 181/286 |
| 4,240,519 A * | 12/1980 | Wynosky | 181/213 |
| 5,923,003 A * | 7/1999 | Arcas et al. | 181/292 |
| 5,997,985 A * | 12/1999 | Clarke et al. | 428/116 |
| 6,871,725 B2 | 3/2005 | Johnson | |
| 7,124,856 B2 | 10/2006 | Kempton et al. | |
| 7,784,283 B2 * | 8/2010 | Yu et al. | 60/770 |
| 7,814,658 B2 | 10/2010 | Akishev et al. | |
| 7,959,109 B2 | 6/2011 | Dasilva et al. | |
| 7,963,362 B2 | 6/2011 | Lidoine | |
| 7,971,684 B2 | 7/2011 | Gantie et al. | |
| 8,025,122 B2 * | 9/2011 | Gilcreest et al. | 181/213 |
| 8,245,815 B2 | 8/2012 | Valleroy et al. | |
| 8,336,316 B2 * | 12/2012 | Kirby | 60/785 |
| 8,413,922 B2 | 4/2013 | Porte et al. | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,733,501 B2 | 5/2014 | Porte et al. | |
| 8,763,751 B2 * | 7/2014 | Starobinski et al. | 181/213 |
| 8,776,946 B2 * | 7/2014 | Todorovic | 181/213 |
| 8,820,477 B1 * | 9/2014 | Herrera et al. | 181/292 |
| 8,955,643 B2 * | 2/2015 | Liu | 181/292 |
| 2011/0100747 A1 | 5/2011 | Hoetzeldt et al. | |
| 2013/0266772 A1 | 10/2013 | Fujii | |
| 2014/0034416 A1 * | 2/2014 | Liu | F02C 7/045 181/290 |
| 2014/0349082 A1 | 11/2014 | Tien | |
| 2015/0284945 A1 | 10/2015 | Tien | |

FOREIGN PATENT DOCUMENTS

| | | |
|---|---|---|
| GB | 1406844 | 9/1975 |
| RU | 2413654 | 6/2010 |

* cited by examiner

ACOUSTIC LINER

BACKGROUND

The present disclosure relates to an acoustic liner and more particularly to an acoustic liner that extends noise attenuation capability to a lower frequency range.

A gas turbine engine may include an acoustic liner for attenuating noise generated during engine operation. A typical acoustic liner includes a honeycomb core connected between a solid face sheet and a perforated face sheet, also known as a single degree of freedom (SDOF), local reacting, liner. This honeycomb core includes a plurality of resonating cavities. The honeycomb core may have a height that tunes the resonating cavities to a specific target frequency of the noise to be attenuated.

New aircraft engine designs are facing increasing noise restrictions within the boundaries of airports by many government regulatory agencies. Accordingly, recent trends in aircraft engine design (i.e. higher bypass ratios, large fan diameter, slower rotating fans, and/or less fan blades) have highlighted the need for acoustic liners that provide sound suppression, such as tonal and broadband sound absorption at relatively low frequencies while utilizing substantially the same or less space than previous liners. Therefore, there is a need in the art for an improved noise attenuating acoustic panel with reduced acoustic liner thickness.

SUMMARY

An acoustic liner according to one, non-limiting, embodiment of the present disclosure includes a first panel; a permeable panel spaced from the first panel; a first wall located between the first and permeable panels and facing in a first direction away from the first panel; and a permeable wall located between the first and permeable panels and facing in a second direction away from the first panel and traversing the first direction.

Additionally to the foregoing embodiment, the first panel is a non-permeable back panel.

In the alternative or additionally thereto, in the foregoing embodiment, the first wall is non-permeable.

In the alternative or additionally thereto, in the foregoing embodiment, the liner includes a plurality of sidewalls spaced from one-another, extending between and engaged to the first panel and the permeable panel, and through the first and permeable walls.

In the alternative or additionally thereto, in the foregoing embodiment, each one of a plurality of cells are defined between the first and permeable panels and adjacent sidewalls of the plurality of sidewalls, and the first and permeable walls are each one of a plurality of first and permeable walls with each one of the plurality of first and permeable walls being generally in a respective one of the plurality of cells.

In the alternative or additionally thereto, in the foregoing embodiment, an angle measured between the first wall and the first panel is about forty-five degrees.

In the alternative or additionally thereto, in the foregoing embodiment, the plurality of first walls each have opposite first and second edges with the first edge engaged to the first panel and the second edge engaged to the permeable panel.

In the alternative or additionally thereto, in the foregoing embodiment, the plurality of permeable walls each have opposite first and second edges with the first edge engaged to the first edge of the first wall and the second edge engaged to the second edge of an adjacent first wall of the plurality of first walls.

In the alternative or additionally thereto, in the foregoing embodiment, the plurality of first and permeable walls are one continuous, folded, panel.

In the alternative or additionally thereto, in the foregoing embodiment, the plurality of permeable walls each have opposite first and second edges with the first edge engaged to the first panel, and parallel to and spaced from the first edge of the first wall, and wherein the second edge of the permeable wall is engaged to the permeable panel and spaced from the second edge of an adjacent first wall of the plurality of first walls.

In the alternative or additionally thereto, in the foregoing embodiment, the permeable panel includes a plurality of non-permeable segments defined and spanning between the second edge of the first wall and the second edge of the adjacent permeable wall.

In the alternative or additionally thereto, in the foregoing embodiment, the plurality of permeable walls each have opposite first and second edges with the first edge engaged to the first wall and the second edge engaged to the permeable panel.

In the alternative or additionally thereto, in the foregoing embodiment, the permeable panel includes a plurality of non-permeable segments defined and spanning between the second edge of the first wall and the second edge of the adjacent permeable wall.

In the alternative or additionally thereto, in the foregoing embodiment, the plurality of permeable walls each have opposite first and second edges with the first edge engaged to the first wall and the second edge engaged to an adjacent first wall of the plurality of first walls.

A liner for a turbofan engine according to another, non-limiting, embodiment includes a non-permeable panel; a permeable panel spaced from the non-permeable panel; a non-permeable wall located between the non-permeable and permeable panels and facing in a first direction away from the non-permeable panel; a permeable, DDOF septum, wall located between the non-permeable and permeable panels and facing in a second direction away from the non-permeable panel and traversing the first direction; and a plurality of sidewalls spaced from one-another, extending between and engaged to the non-permeable and permeable panels, and through the non-permeable and permeable walls.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
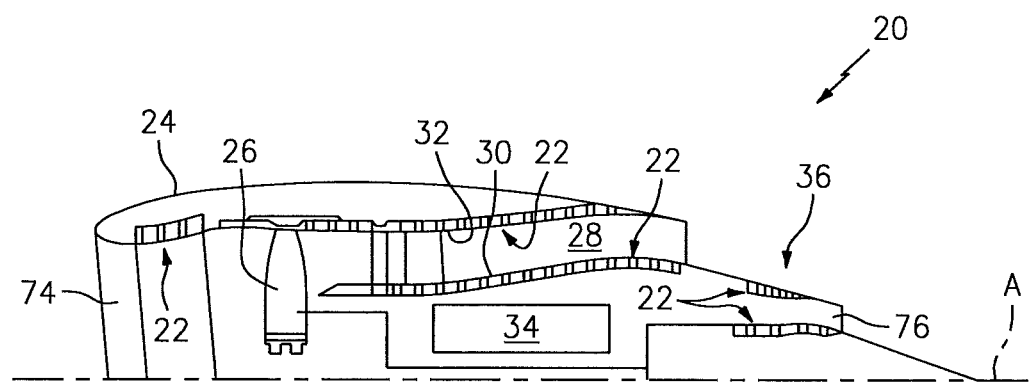
FIG. 1 is a partial cross section of a turbofan engine including at least one acoustic liner of the present disclosure.

Referring to FIG. 1, a turbofan engine 20 is illustrated as one example of an application using an acoustic liner 22 of the present disclosure. The engine 20 is centered about an axis A, and includes a nacelle intake cowling 24, a fan section 26 downstream of the intake cowling 24, an annular air bypass flowpath 28 downstream of the fan section 26 and generally defined between radial inner and outer walls 30, 32, an engine core 34 located radially inward of the inner wall 30, and an exhaust nozzle 36 located downstream of the engine core 34. The acoustic liner 22 may be carried by a radially inward facing wall of the intake cowling 24; the inner and/or outer walls 30, 32; and/or, the exhaust nozzle 36 to suppress noise in the respective vicinities. It is further contemplated and understood that the acoustic liner 22 may be applied to any other application where noise suppression, and particularly low frequency noise suppression, is desirable.

Figure 2:
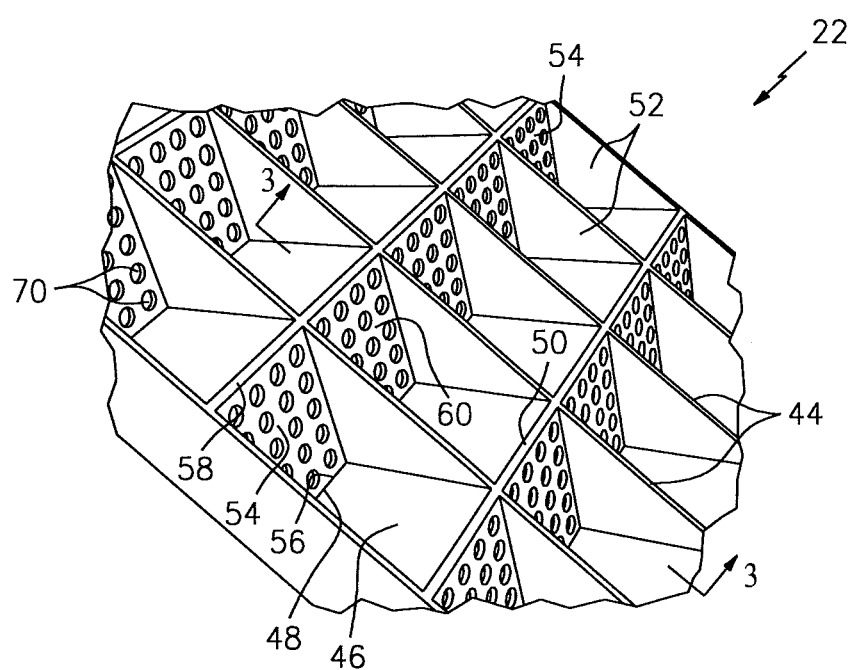
FIG. 2 is a partial perspective view of the acoustic liner with a permeable panel removed to show internal detail.
Figure 3:
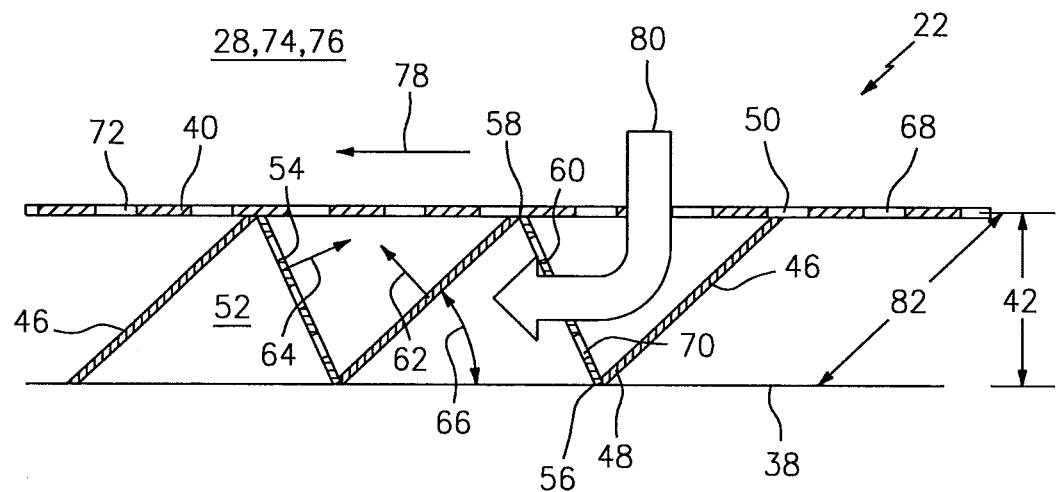
FIG. 3 is a partial cross section of the acoustic liner taken along line 3-3 of FIG. 2.

Referring to FIGS. 2 and 3, the acoustic liner 22 may have a non-permeable back panel 38 and permeable panel 40 that is parallel to and spaced from the panel 38 by a distance (see arrow 42). A plurality of elongated sidewalls 44 extend laterally between and engage to the panels 38, 40. The sidewalls 44 are spaced from one-another, may substantially be parallel to one-another, and may be substantially normal to the panels 38, 40. A plurality of elongated non-permeable walls 46 extend longitudinally through the plurality of sidewalls 44 and have opposite first and second edges 48, 50, with the first edge 48 being engaged to the non-permeable panel 38 and the second edge 50 being engaged to the permeable panel 40. A plurality of cells 52 of the liner 22 are defined by and between the panels 38, 40, adjacent non-permeable walls 46, and adjacent sidewalls 44. A plurality of elongated permeable walls 54 extend longitudinally through the plurality of sidewalls 44 and have opposite first and second edges 56, 58. The first edge 56 may be engaged to the first edge 48 of the non-permeable wall 46 and/or engaged to the non-permeable panel 38. The second edge 58 of each permeable wall 54 may be engaged to the second edge 50 of each respective and adjacent non-permeable wall 46 and/or engaged to the non-permeable panel 38. A permeable segment 60 of the plurality of permeable walls 54 is in each one of the plurality of cells 52. The plurality of non-permeable walls 46 and plurality of permeable walls 54 may be one continuous fold panel, folded along the respective first edges 48, 56 and again at the respective second edges 50, 58.

The non-permeable wall 46 and the permeable wall 54 are generally angled with respect to the non-permeable panel 38 and the permeable panel 40. More specifically, the non-permeable wall 46 faces in an outward direction (see arrow 62) normal to the wall 46 and away from the non-permeable panel 38 and through the permeable panel 40. The permeable wall 54 faces in an outward direction (see arrow 64) normal to the wall 54 and away from the non-permeable panel 38, through the permeable panel 40, and such that the directions 62, 64 traverse one-another (i.e. are transverse to one-another). An angle (see arrow 66) taken between the panel 38 and non-permeable wall 46 may be about forty-five degrees, and generally, the smaller the angle 66, the greater is the attenuation of lower frequency noise.

The permeable panel 40 has a plurality of holes 68 with at least one hole communicating with each respective cell 52. The permeable wall 54 has a plurality of holes 70 and each wall segment 60 may have a multiple of holes 70. It is further contemplated and understood that the holes 68, 70 may be, or achieved through, perforations, a mesh layer, a combination of a perforated layer and a mesh layer, a screen or other type of skin that permits the passage of air. It is also understood that with the combination of the permeable panel 40 and the permeable wall 54, the acoustic liner 22 may behave as a double degree of freedom (DDOF) liner with the wall 54 being a DDOF septum, and use of the sidewalls 44 generally make the liner a local reacting liner.

With further regard to the turbofan engine 20 application (see FIG. 1), the permeable panel 40 of the acoustic liner 22 is a perforated panel having an outer face 72 that may define, in-part, an air passage such as, for example, the generally cylindrical intake passage 74 of the intake cowling 24. Alternatively, the face 72 may define, at least in-part, the bypass flowpath 28 and/or an exhaust channel 76 of the exhaust nozzle 36. It should be appreciated to those skilled in the art that the physical dimensions of the acoustic liner 22 may be altered or tuned to suppress targeted resonating frequency bandwidths without departing from the novelties of the present disclosure. For instance, the liner 22 may be tuned to suppress the relatively high frequency bandwidths emitted from a turbine section of the engine core 34, or may be tuned to suppress the lower frequency bandwidths emitted from a combustor section of the engine core 34.

The acoustic liner 22 may be made of any variety of materials depending upon a particular application including metals, composites and ceramics. For instance, if the acoustic liner 22 is applied to the exhaust nozzle 36 of the turbofan engine 20, a liner made of ceramic may be desirable to withstand exposure to high temperatures. The liner may be manufactured using any variety and combinations of known manufacturing techniques; and, for more complex liner structures may be manufactured using, at least in-part, an additive manufacturing process.

In operation, an airstream flows across the outer face 72 and in a shearing direction (see arrow 78) with respect to the acoustic liner 22. Noise from this airstream generally enters each cell 52 along an air/sound path (see arrow 80), through the hole(s) 68 in the permeable panel 40, into the cell 52, and through the holes 70 in the wall segment 60 of the permeable wall 54. Because of the angular relationship of the non-permeable wall 46 with the panels 38, 40 a general length (see arrow 82) of the air/sound path 80 is greater than the length 42 between the panels 38, 40. This length difference (or increase in path length from more traditional acoustic panels) is advantageous for attenuating low frequency noise increasingly more common in current gas turbine engines due to higher bypass ratios, slower fan speeds and less fan blades. Furthermore, the acoustic liner 22 may be thinner than more traditional acoustic liners thereby improving the liner application for the next generation, slimmer, nacelle designs.

Figure 4:
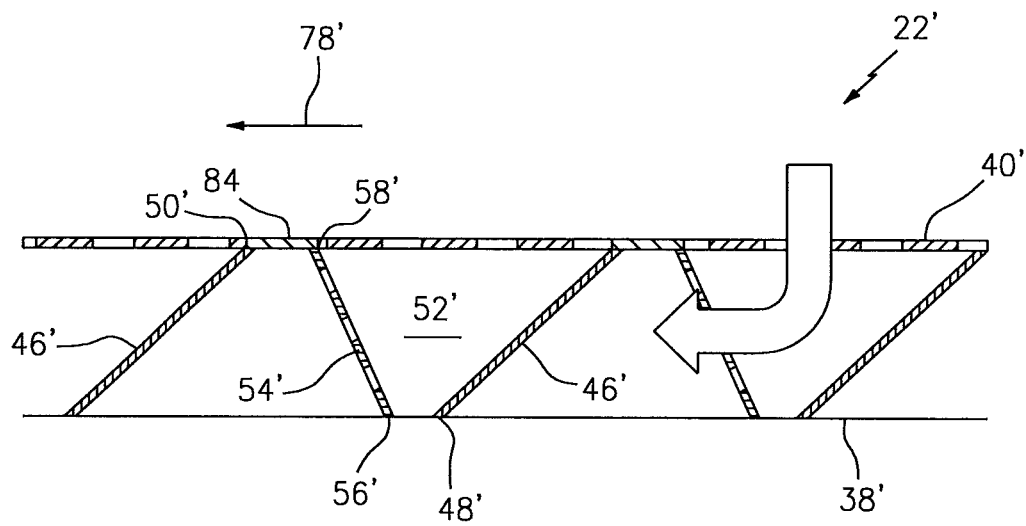
FIG. 4 is a partial cross section of a second embodiment of an acoustic liner.

Referring to FIG. 4, a second embodiment of an acoustic liner is illustrated wherein like elements to the liner 22 have like identifying element numbers except with the addition of a prime symbol. In a given cell 52' of a liner 22', a first edge 56' of a permeable wall 54' and a first edge 48' of a first non-permeable wall 46' are both engaged to a non-permeable panel 38' and are spaced from one-another. Similarly, a second edge 58' of the permeable wall 54' and a second edge 50' of an adjacent, second, non-permeable wall 46' are both engaged to a permeable panel 40' and spaced from one-another. The second edge 58' of the permeable wall 54' is upstream of the second edge 50' of the second non-permeable wall 46' and with respect to an airstream flow direction 78'. An elongated non-permeable segment 84 of the permeable panel 40' is generally defined laterally between the second edges 50', 58', and defines in-part the given cell 52'. The greater the segment's width between edges the larger is the effective cell volume, thereby enhancing attenuation capability of low frequency noise.

Figure 5:
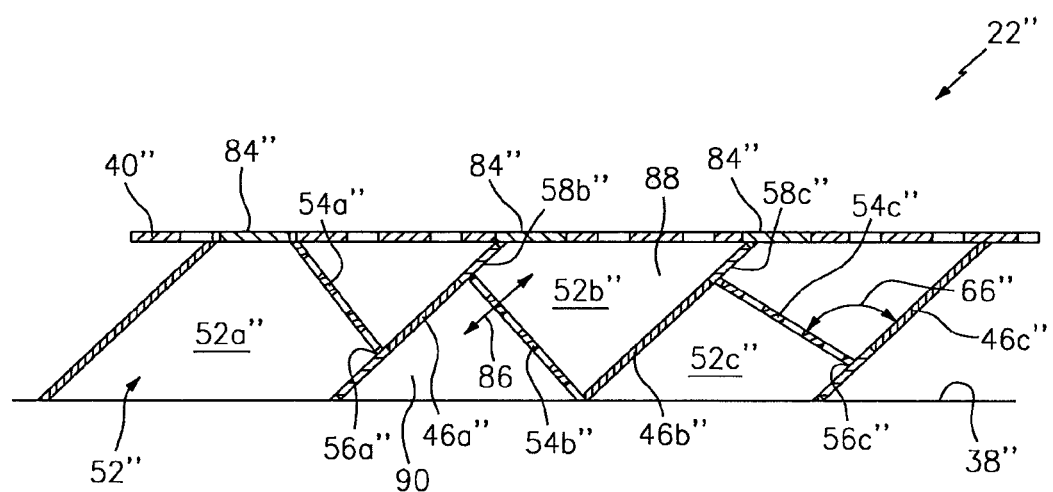
FIG. 5 is a partial cross section of a third embodiment of an acoustic liner.

Referring to FIG. 5, a third embodiment of an acoustic liner is illustrated wherein like elements to the first and second liners 22, 22' have like identifying element numbers except with the addition of a double prime symbol. An acoustic liner 22" may have a plurality of cells 52" that include cells of varying orientations. For instance, cells 52" may have a cell 52a", a cell 52b" and a cell 52c". Cell 52a" is similar to the cell of the second embodiment (i.e. cell 52') except that a first edge 56a" of a permeable wall 54a" is engaged to a first non-permeable panel 46a" and is space from a non-permeable panel 38". Cell 52b" may be similar to the cell of the first embodiment (i.e. cell 52) except that a second edge 58b" of a permeable wall 54b" is engaged to the non-permeable wall 46a" and spaced inward from a permeable panel 40". Cell 52c" may generally be a combination of cell 52a" and cell 52b" attributes such that a permeable wall 54c" has opposite edges 56c", 58c" engaged to respective, adjacent, non-permeable walls 46c", 46b", and spaced from respective panels 38", 40". The variety of cell structures is a means of fine tuning the noise attenuation efficiency of the liner for a given application. The positioning of the permeable walls 54a", 54b", 54c" will vary the area of each wall and alter an angle 66" between the permeable walls and the respective non-permeable walls 46a", 46b", 46c".

Acoustic characteristics of the liner 22" may further be adjusted by varying the porosity of the permeable panel 40" and/or the porosity of the permeable wall or septum 54b" (as one example). Yet further, re-positioning of the wall 54b" along a centerline or direction (signified by arrow 86) so as to adjust or shift the volumes of respective fore and aft cell portions 88, 90 of the cell 52" is also a means to adjust the acoustic characteristics.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. An acoustic liner comprising:
a first panel;
a permeable panel spaced from the first panel;
a first wall located between the first and permeable panels and facing in a first direction away from the first panel, wherein the first wall is non-permeable;
a permeable wall located between the first and permeable panels and facing in a second direction away from the first panel and traversing the first direction; and
a plurality of sidewalls spaced from one-another, extending between and engaged to the first panel and the permeable panel, and through the first and permeable walls;
wherein each one of a plurality of cells are defined between the first and permeable panels and adjacent sidewalls of the plurality of sidewalls, and the first and permeable walls are each one of a plurality of first and permeable walls with each one of the plurality of first and permeable walls being generally in a respective one of the plurality of cells;
wherein the plurality of first walls each have opposite first and second edges with the first edge engaged to the first panel and the second edge engaged to the permeable panel;
wherein the plurality of permeable walls each have opposite first and second edges with the first edge engaged to the first wall and the second edge engaged to the permeable panel, and the first edge is spaced from the first panel; and
wherein an angle measured between the first wall and the first panel is about forty-five degrees.

2. The acoustic liner set forth in claim 1, wherein the first panel is a non-permeable back panel.

3. The acoustic liner set forth in claim 1, wherein the permeable panel includes a plurality of non-permeable segments defined and spanning between the second edge of the first wall and the second edge of the adjacent permeable wall.

4. A liner for a turbofan engine comprising:
a non-permeable panel;
a permeable panel spaced from the non-permeable panel;
a non-permeable wall located between the non-permeable and permeable panels and facing in a first direction away from the non-permeable panel;
a permeable, DDOF septum, wall located between the non-permeable and permeable panels and facing in a second direction away from the non-permeable panel and traversing the first direction; and
a plurality of sidewalls spaced from one-another, extending between and engaged to the non-permeable and permeable panels, and through the non-permeable and permeable walls;
wherein the permeable, DDOF septum, wall extends between opposing first and second edges, the first edge contacts the non-permeable wall and is discrete from the non-permeable panel, and the second edge contacts the permeable panel.

5. An acoustic liner, comprising:
a first panel;
a permeable panel spaced from the first panel;
a first wall located between the first and permeable panels and facing in a first direction away from the first panel, wherein the first wall is non-permeable;
a permeable wall located between the first and permeable panels and facing in a second direction away from the first panel and traversing the first direction; and a plurality of sidewalls spaced from one-another, extending between and engaged to the first panel and the permeable panel, and through the first and permeable walls;

wherein each one of a plurality of cells are defined between the first and permeable panels and adjacent sidewalls of the plurality of sidewalls, and the first and permeable walls are each one of a plurality of first and permeable walls with each one of the plurality of first and permeable walls being generally in a respective one of the plurality of cells;

wherein the plurality of first walls each have opposite first and second edges with the first edge engaged to the first panel and the second edge engaged to the permeable panel; and wherein the plurality of permeable walls each have opposite first and second edges with the first edge engaged to the first wall and the second edge engaged to the permeable panel, and the first edge is spaced from the first panel.

* * * * *